(12) United States Patent
Fukushima et al.

(10) Patent No.: US 6,286,014 B1
(45) Date of Patent: Sep. 4, 2001

(54) METHOD AND APPARATUS FOR ACQUIRING A FILE TO BE LINKED

(75) Inventors: Takashi Fukushima, Yamato; Saeko Murakami, Yokohama; Kazuto Nakamichi, Fujisawa, all of (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/098,058

(22) Filed: Jun. 16, 1998

(30) Foreign Application Priority Data

Jun. 24, 1997 (JP) .................................................. 9-167299

(51) Int. Cl.[7] ...................................................... G10L 3/00
(52) U.S. Cl. ........................ 707/200; 707/101; 707/102; 707/104; 707/201; 707/203
(58) Field of Search .................................. 707/1, 9, 200, 707/513, 104, 6, 100, 102, 205; 704/275; 709/218; 379/93; 395/616

(56) References Cited

U.S. PATENT DOCUMENTS

| | | | | |
|---|---|---|---|---|
| 5,572,728 | * | 11/1996 | Tada et al. ............................ | 395/616 |
| 5,875,429 | * | 2/1999 | Douglas et al. ...................... | 704/275 |
| 5,908,467 | * | 6/1999 | Barrett et al. ........................ | 709/218 |
| 5,923,736 | * | 7/1999 | Shachar .................................. | 379/93 |
| 5,946,647 | * | 8/1999 | Miller et al. ............................ | 707/9 |
| 5,958,016 | * | 9/1999 | Chang et al. ........................ | 709/229 |
| 5,983,184 | * | 11/1999 | Noguchi ................................ | 704/270 |
| 5,983,351 | * | 11/1999 | Glogau .................................. | 713/201 |

\* cited by examiner

Primary Examiner—Thomas Black
Assistant Examiner—Thuy Do
(74) Attorney, Agent, or Firm—A. Bruce Clay; Carstens, Yee & Cahoon (57) ABSTRACT

A specific word is selected from an explanatory note of a link file in an HTML document and displayed with emphasis in the display of the HTML document. When a voice input of the word of emphasized display is detected, a link file corresponding to that word is connected.

17 Claims, 6 Drawing Sheets

| Reading | Notation | Link File |
|---------|----------|-----------|
| hotel | ho'ute'l | news1.html |
| sales | se'ilz | news2.html |
| computer | kəmpju:tə | news3.html |
| virus | va'irəs | news4.html |

FIG. 3

```
<HTML>
<BODY>
<P>                                    101
News Flash (Updated at 16:00 May 1)
<UL>

<L1><A href="news1.html"> X-corporation to sell [hotel] [chain] </A>

<L1><A href="news2.html"> [Sales] by [automakers] down in [Europe.]
</A>
<L1><A href="news3.html"> I-company develops a new [computer]        102
   called "ThinkMan".
</A>
<L1><A href="news4.html"> New [computer] [virus] found in Australia.
</A>

</UL>
</BODY>
</HTML>
```

METHOD AND APPARATUS FOR ACQUIRING A FILE TO BE LINKED

TECHNICAL FIELD OF INVENTION

This invention relates to an information processing apparatus, and method of acquiring a file to be linked.

BACKGROUND OF THE INVENTION

In a communication network such as the Internet, a server can provide information for displaying a document in which text, an image and voice are mixed together (called hypertext hereafter) as a home page. A client can edit the hypertext for display in the form of a document. An application program or a device to display such hypertext is called a browser. Hypertext defines a character string to be displayed and a format thereof (including the size of a character) and describes an explanation of a file (text, image and voice, etc.) to be linked. Such hypertext is described in HTML (Hypertext MARKUP LANGUAGE) language, for example.

When a client browser receives hypertext, it displays a character string or a explanatory note written in the hypertext according to the format thereof. When a user selects the explanatory note, the browser links to a file based on the file name (called link file name) written in the hypertext in association with the explanatory note to display the file in the display screen. Also, when the file to be linked is voice, it is reproduced in the client side for output.

The browser is installed on a computer such as a general purpose personal computer for execution. Recently, improvements in voice recognition technology allow a user to input voice instead of keyboard characters.

Input by voice is effective for a stereotypical character string such as "forward" (proceeding to the next display screen), "backward" (proceeding to the previous display screen) and reload commands which can be input orally through the browser.

However, the user has to point to the explanatory note of the file to be linked with a mouse and can not orally instruct the display or the file to be linked.

It is, therefore, an object of the present invention to provide a browser which allows voice input without requiring prepared hypertext.

SUMMARY OF THE INVENTION

To achieve the above objective, the present invention provides an information processing apparatus which takes in a document containing a file name of one or more files to be linked and one or more explanatory notes associated with the file name of the above one or more files to be linked, displays at least a part of the one or more explanatory notes in a display and acquires a file of the file name associated with a selected explanatory note when any of the one or more explanatory notes is selected. The apparatus comprises first means for specifying a word to be displayed with emphasis in each of the one or more explanatory notes, second means for applying an emphasized display conversion to the specified word, third means for acquiring inputted voice information, fourth means for selecting a word corresponding to the inputted voice information, and fifth means for acquiring a linked file name associated with the explanatory note containing the selected word.

As used herein, the emphasized display conversion is a concept which includes a method of converting a character attribute including a color, a font and a size, etc. of a character string, inserting a parenthesis or a double quotation, etc., preceding or following a character string, and displaying a phonetic reading or a pronunciation symbol, etc., of the character string near the character string or in another predetermined place.

The present invention further comprises an information processing apparatus in which the first means compares the numbers of a plurality of words included in the explanatory note to identify a word having the largest number of characters as the word to be displayed with emphasis. The second means displays the phonetic reading of the word identified by the first means in association with display of the word for emphasized display conversion. The display control means displays the word detected by the first word detecting means with emphasis in a different color.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
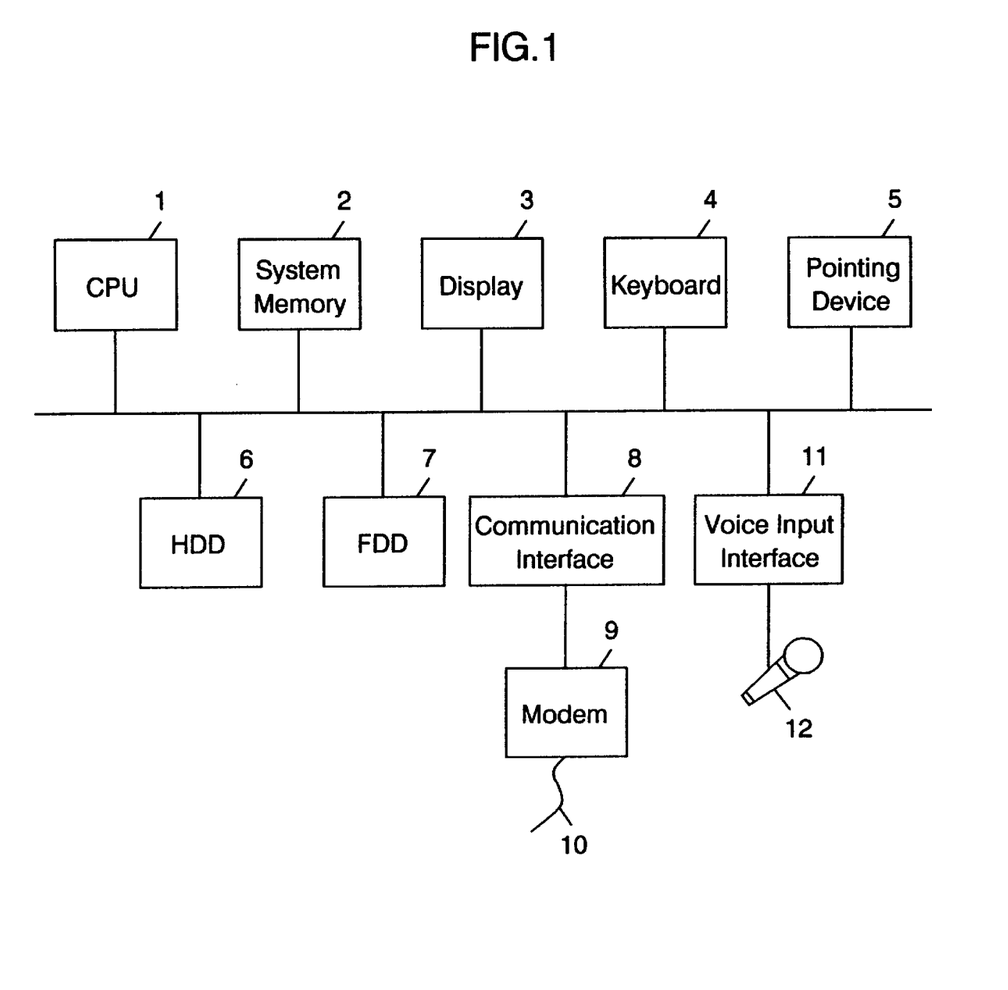
FIG. 1 is a block diagram showing the system configuration of an embodiment of the present invention.

FIG. 1 shows a system configuration of a general purpose personal computer in which a browser in accordance with the present invention is installed. The system of FIG. 1 operates as a client. Components which are described hereunder are connected to a bus. A CPU 1 executes control of the overall apparatus, as well as the browser and an application program indicated by the browser, according to a system program stored in a system memory 2. The system memory 2 comprises a read-only memory (ROM) and a random access memory (RAM). A basic font and a system program for power on are stored in the ROM.

A system program for system execution which is read from an HDD (hard disk storage device) and input/output data in various arithmetic operation in the CPU 1 are stored in the RAM. The system memory includes a memory for exclusively storing an image displayed in the display 3. Data displayed in the display 3 is periodically read by the CPU 1 or DMA (direct memory access controller, not shown) and sent to the display 3 for display.

A command, a character and a numeral, etc., are inputted to the CPU 1 from a keyboard 4. A mouse may be used as a pointing device 5 to point to a position on the display screen of the display 3. With this pointing of the position, the CPU 1 executes a predetermined command based on GUI (graphic user interface).

A system program such as an OS (operating system) and an application program to be later described are stored in a HDD 6. The HDD 6 further stores dictionaries (described later) used in voice input processing of this invention.

An FDD (floppy disk drive) 7 receives a floppy disk and reads/writes information from and to the floppy disk under the control of the CPU 1. The FDD 7 can receive a floppy disk in which a browser program of this invention is recorded for installation in the HDD 6. A CD ROM drive may be used instead of the FDD 7. A communication interface such as RS232C is connected to a modem 9 for connection to a server via the modem 9 and public telephone network 10.

A voice input interface 11 converts an analog voice signal from a microphone 12 to of a digital form for delivery to the CPU 1. Additionally, a voice output means (not shown) such as a speaker and its output interface is connected to the bus.

Figure 2:
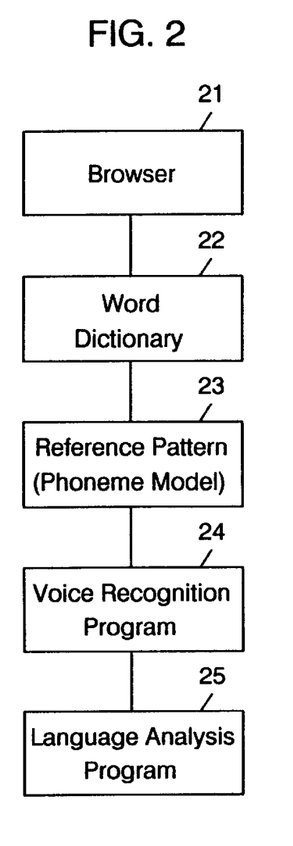
FIG. 2 is a diagram showing the content of a file mounted on a hard disk drive.

The program and dictionary involved in voice input are now described with reference to FIG. 2. Files described hereunder are saved in the HDD 6. In FIG. 2, a browser 21 is an application program for displaying an HTML document. The browser 21 also has an internal program for inputting voice. The program contents for processing other than the voice input, for example, communication processing to control a communication program such as TCP/IP (not shown) for taking in an HTML document from the server and a program content to take in a link file defined in the HTML document, i.e., text and an image, etc., to execute a process of displaying in the display 3 are the same as in a conventional browser.

A word dictionary 22 contains the word spelling/notation, its pronunciation, and additional grammatical information which can be used in parsing sentences. In the case of Japanese language, the pronunciation is expressed in Kana strings instead of phonetic symbols.

A reference pattern 23 is a file which correlates a feature pattern of a voice to an identification label and is used for voice recognition. In this context, the feature pattern of a voice is a time sequential series of voice features (called a voice feature series) which are obtained by a Fourier analysis of, for example, a predetermined length of a voice including a phoneme or a phoneme element (an element of divided phoneme). The identification label of a voice is a symbol given to a phoneme or a phoneme element and may use a character code. While a hidden Markov model is known as such a reference pattern, any other well known reference pattern may be used.

A voice recognition program 24 is a program for recognizing a voice and any well known program may be used. When a hidden Markov model is used, the voice recognition program 24 Fourier analyzes an input voice to convert it to a feature pattern. The voice recognition program 24 then concatenates phoneme models of a word to be recognized from the reference pattern 23, calculates the score of each model for the feature sequence of a user inputted voice with respect to the model of that word and selects the best one. This invention may be practiced also by using a feature pattern matching determination method such as a DP matching.

A language analysis program 25 extracts a word from a character string constituting a sentence, etc.

In this mode of practicing the present invention, a word is extracted from a sentence when it is found in the word dictionary 22, which comprises only nouns and noun phrases. This method provides a simple way to parse sentences. Any other well known method for parsing sentences may be adopted as an alternative. A link file is specified by voice through automatically extracting a word from the explanatory note of a link file written in an HTML document and determining the link file which has the same word input by voice.

Figure 3:
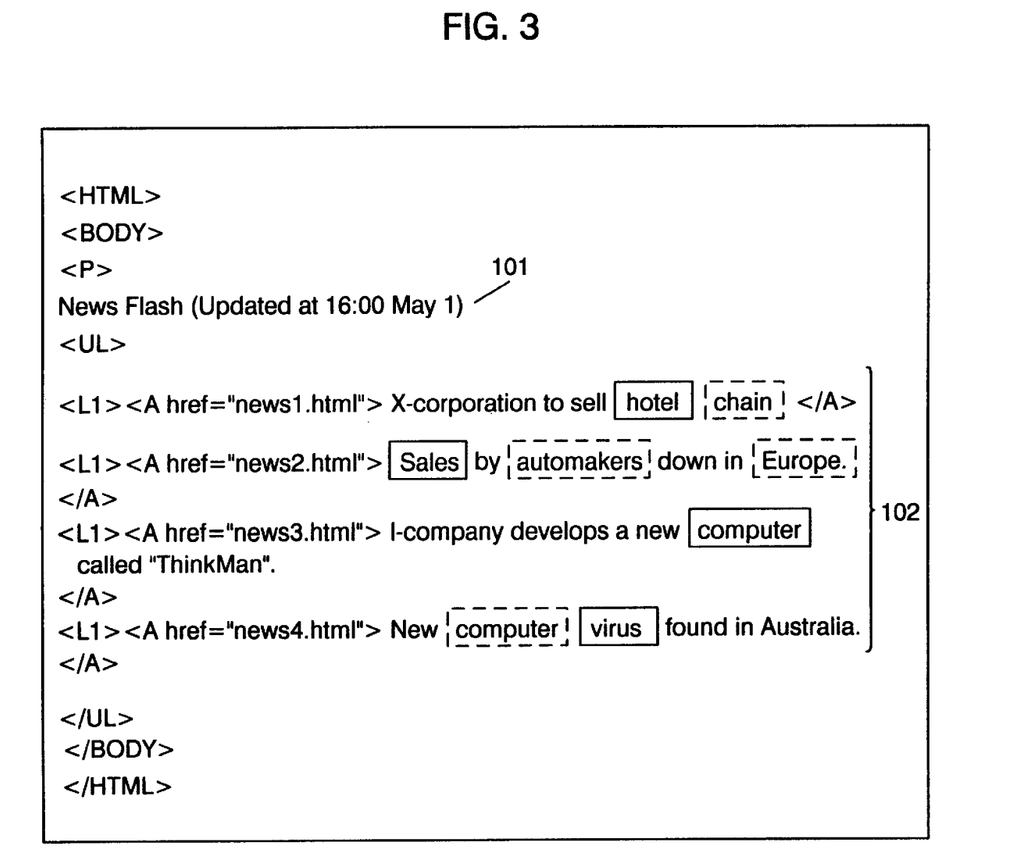
FIG. 3 shows an example of an HTML document.

An HTML document is next described briefly with reference to FIG. 3. In FIG. 3, <HTML> is a definition (also called a tag) declaring the beginning of an HTML document. The end of an HTML document is defined by </HTML>. A hypertext described between the beginning and the end of an HTML document is the subject of an output (display, voice output). <BODY>, </BODY> are the definition of the beginning and the end of the text. <P> is a definition to indicate shifting the display position downward by one line. <UL>, </UL> indicates a range of displaying a character string beginning with <L> by itemizing with a symbol ● added. A character string 101 (News Flash (Updated at 16:00 on May 1) is provided only for display. A definition group 102 illustrates link files.

'<A href="news1.html"> X-corporation to sell hotel chain. </A>' is a definition of a link file and its explanatory note. Here, [A href=" "] is a definition of existence of a link document while the character string marked by " " indicates the file name of a linked file. [X-corporation to sell hotel chain] is the explanatory note and the subject of the display. </A> indicates the end of the explanatory note.

The HTML document and the link file to be linked are saved in the server side and delivered to the client in response to the request by the browser in the client side.

Figure 4:
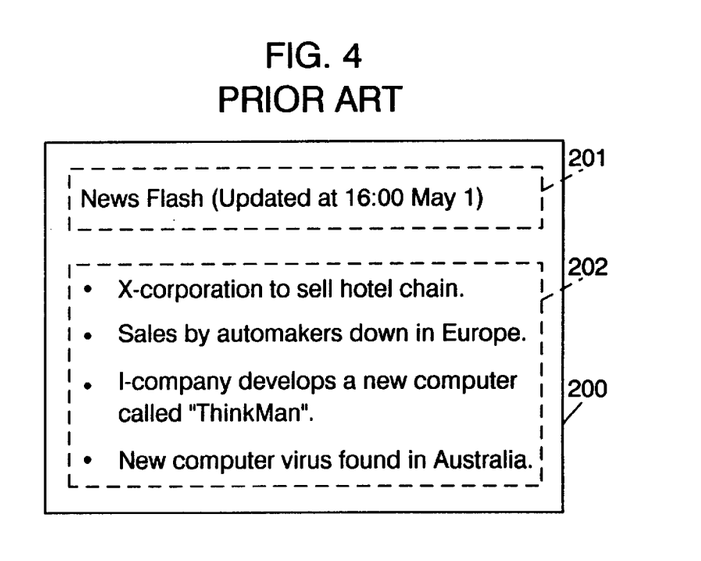
FIG. 4 shows a display content of prior art of an HTML document as shown in FIG. 3.

In accordance with the prior art upon receipt in the client side, the HTML document is analyzed by the browser 21 and displayed as shown by the reference numeral 200 of FIG. 4. The character string 201 corresponds to the character string 101 in the HTML document of FIG. 4. The character string 202 is an explanatory note of the link file and corresponds to the definition group 102 of FIG. 4. Normally, the color of a display only character string is set by a default value to a color different from the explanatory note of the link file. Thus, in accordance with the prior art, when any of explanatory notes is pointed to by a mouse, the link file corresponding thereto is read from the server for display by the client. As taught herein, the form of display is different from the prior art, as will be subsequently explained hereunder.

Figure 7:
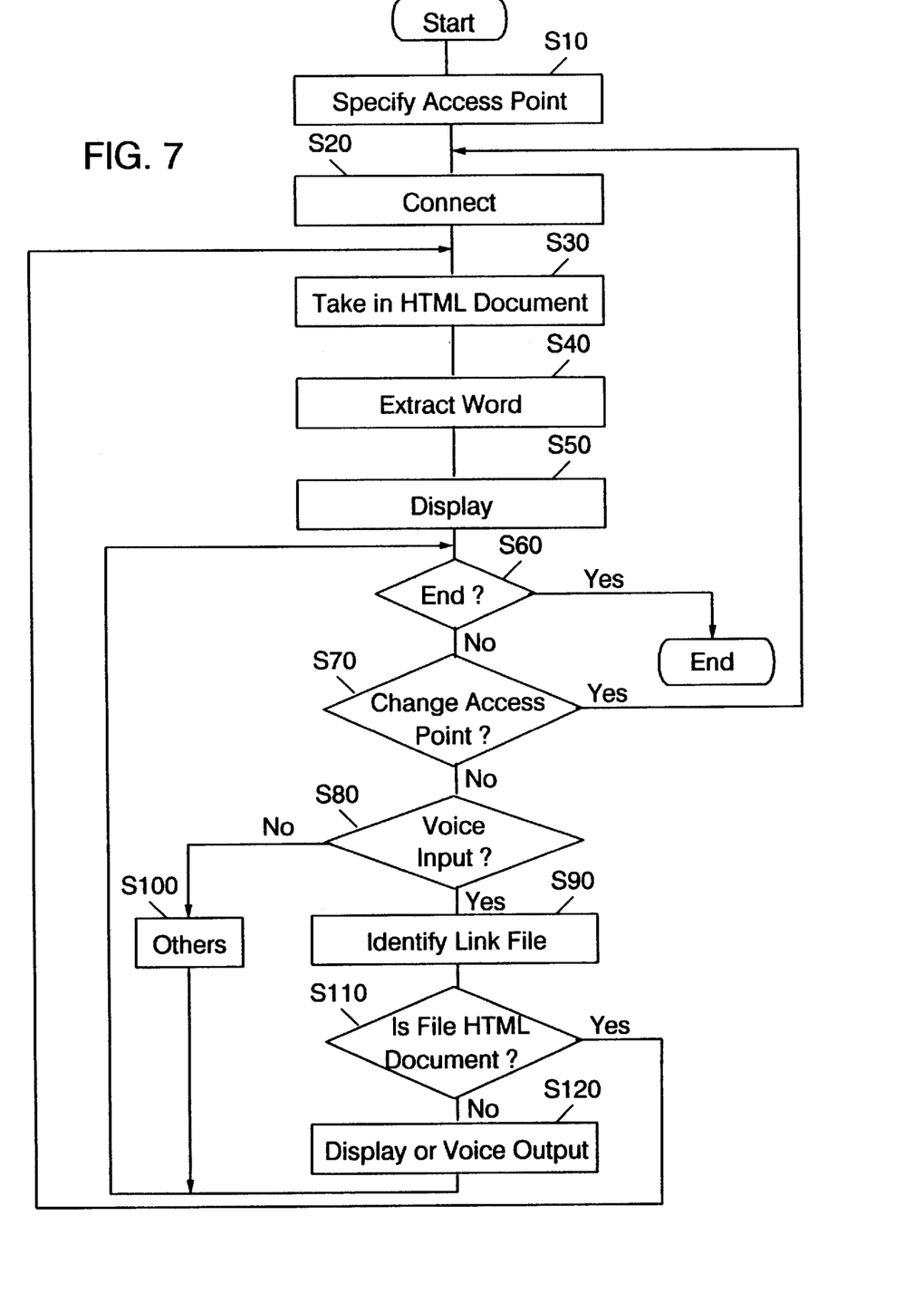
FIG. 7 is a flow chart showing a process procedure executed by a central processing unit.
Figure 8:
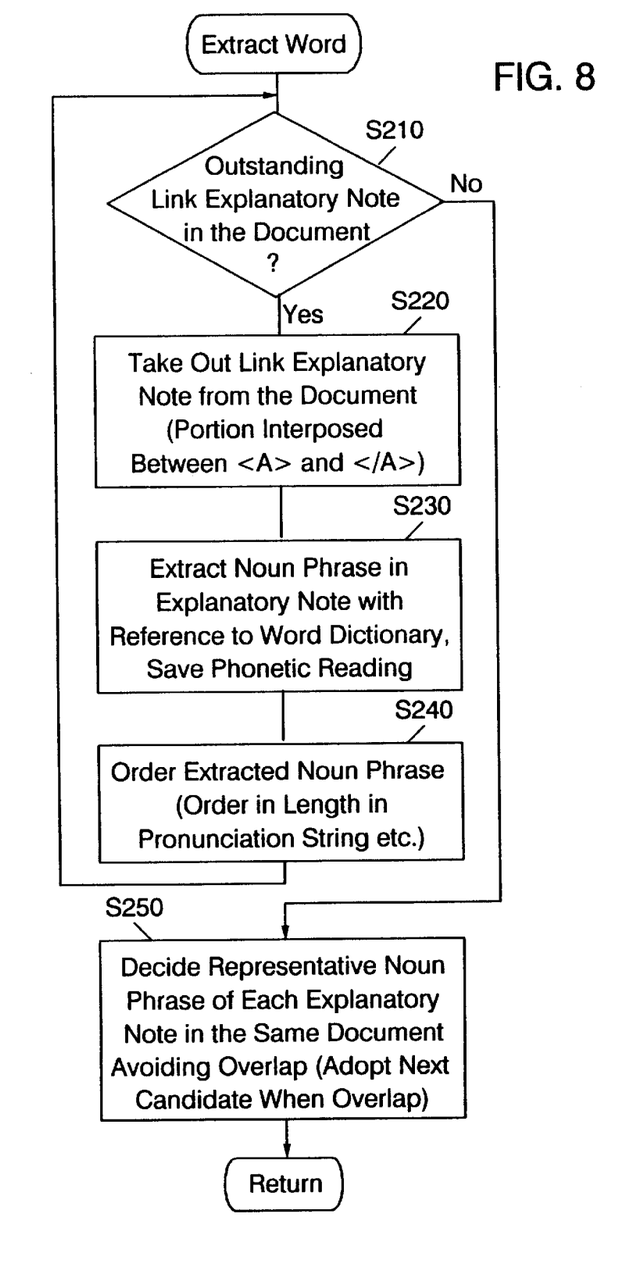
FIG. 8 is a flow chart showing a process procedure executed by a central processing unit.
Figure 9:
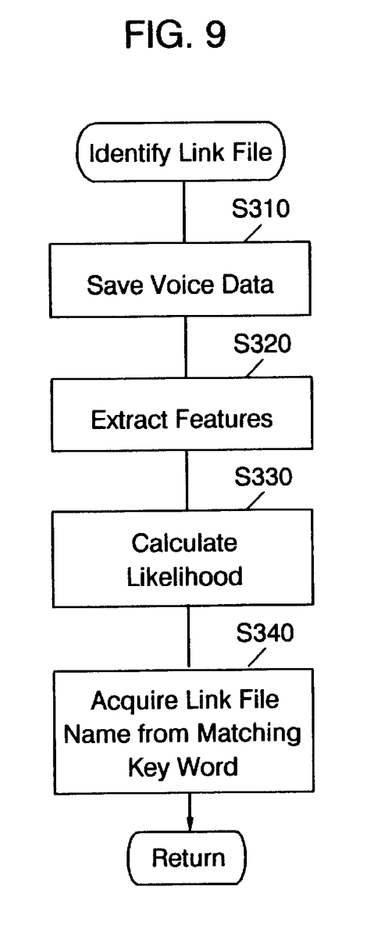
FIG. 9 is a flow chart showing a process procedure executed by a central processing unit.

A processing operation of the browser 21 relating to a voice input will now be described with reference to the flow charts in FIG. 7 to FIG. 9. In actual practice, the processing procedure shown in FIG. 7 to FIG. 9 is written in a program code which can be executed by the CPU 1. However, it is functionally expressed in FIG. 7 to FIG. 9 for the convenience of explanation.

It is assumed that the client side has been connected to a communication network having a server such as the internet, through a public telephone network 10, and the browser 21 has been started.

In FIG. 7, using a keyboard 4 the user inputs a communication address (also called a uniform resource location (URL) where an HTML document (home page) exists. From this address, the CPU 1 gains access to a server which has the specified URL and receives the HTML document of the specified URL, e.g., the HTML document shown in FIG. 3 through the communication interface 8 for temporary storage in the system memory 2 (steps S10 to S30).

Figure 6:
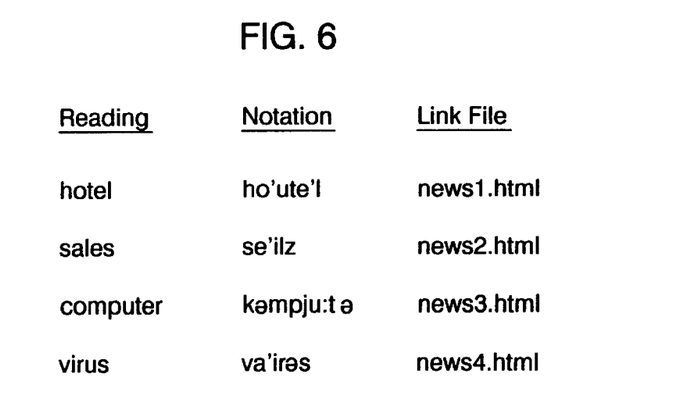
FIG. 6 is a chart showing the contents of a word extracted from the explanatory note of a link file and related information.

The CPU 1 searches for the temporarily stored HTML document to extract a word from the explanatory note of the link file. The word extracting process will be later described using FIG. 8. In the mode of practicing the present invention, one word is extracted for each definition of the link file and stored in the dedicated region (hereafter called extracted word region) in the system memory 2. In step S40, the link file name written in the definition of the link file and a pronunciation of the word are stored in association with the extracted word as shown in FIG. 6.

Next, the CPU 1 displays the HTML document. An example of the display is shown by the reference number 300 in FIG. 5A. At this time, the same word as the extracted word in the HTML document is added with the pronunciation 400 written in the extracted word region and displayed with emphasis as shown by the reference numeral 303 of FIG. 5A. The display only character string 301 is in black while the explanatory note 302 of the link file is displayed, for example, in blue (step S50 of FIG. 7).

Using a microphone, the user inputs a voice character string with pronunciation attached in the character strings displayed in blue. When it is detected in the CPU 1 that a voice was inputted in step S80, the CPU 1 identifies a link file corresponding to the character string inputted by a voice for link processing. At this time, when the name of the file to be linked has an identifier indicating that it is an HTML document, the procedure is returned to the step S30 and the above described word extract process as well as the voice specification of a link file by a voice are executed with respect to the linked HTML document (steps S80-S90-S110-S30).

On the other hand, when the link file name has an identifier indicating that the file is an image file, such as JPEG and GIF, the CPU 1 takes in the file from the linked file and displays it in the display 3 (steps S80-S90-S110-S120). It should be understood that the link file is outputted in voice when it is a voice file. In accordance with the prior art, a process for saving the displayed document is executed in the loop of S60-S80-S100-S60.

When the user changes the access to a home page, the change (input of a new URL) is detected in step S70 and the procedure returns to step S20. By this, the above described pre-processing for a voice input, i.e., the word extract process, is performed with respect to a new HTML document.

When the user indicates the end of processing with the keyboard 4 or the pointing device (mouse) 5, this indication is detected in the step S60 and the process procedure of FIG. 7 ends.

The step S40 of FIG. 7 is shown in greater detail in FIG. 8. As previously described above, the explanatory note relating to a link file begins with <A . . . "> and ends with </A>. Therefore, the position of the character strings of <A . . . "> and </A>are detected by using a word retrieving function which is provided in the computer and is well known in document processing to detect a character string interposed between the two character positions detected (step S220).

The detected character string is temporarily stored in the system memory 2. The CPU 1 then reads out the leading word in the word dictionary 22 and determines whether or not the word read out exists in the extracted character string. If there is a same character string, it is temporarily stored in the system memory 2. However, even if the same character string is detected, it is eliminated if the grammatical information is not a noun phrase. Determination of existence or absence is then executed repeatedly in the sequence of items in the word dictionary 22 to pick up a word of noun phrase contained in the explanatory note of the link file. When the above described process is performed for the first explanatory note of the HTML document of FIG. 3, "hotel (ho'ute'1)", "chain (che'in)", "sales (se'ilz)", . . . are obtained. At this time, the pronunciation written in the word dictionary 22 is also temporarily stored together in the system memory 2.

In this case, consecutive nouns, e.g., "hotel" and "chain", for example, can be joined into a single noun phrase, if users want to pronounce longer words for voice inputting.

The CPU 1 then decides on a word to be displayed with emphasis (phonetic reading added) among the one or more extracted words based on a predetermined criteria.

In the mode of practicing this invention, a word comprising the largest number of phonetic characters (Katakana, Hiragana, etc. in case of Japanese) is determined to be a character to be displayed with emphasis. When there are multiple words with an equally large number of characters, a word nearest the top of the explanatory note, for example, is determined to be the word to be displayed with emphasis and stored in the above described extracted word region together with a phonetic reading (step S240).

The explanatory notes of the link files in the HTML document are detected in sequence and a word to be displayed with emphasis is determined from the detected explanatory note (loop process of steps S210 to S240 of FIG. 8).

In storing in the word extract region, it is determined whether or not a newly extracted word overlaps the word so far extracted (the word to be displayed with emphasis) and if there is an overlap, the word existing in the same explanatory note in the next succeeding order is replaced with the word to be displayed with emphasis (step S250). In the example of the HTML document of FIG. 3, while the word "computer" is extracted as a word to be displayed with emphasis from the two explanatory notes of the link file, respectively, the word extracted from the following explanatory note overlaps the word extracted from the preceding explanatory note so that the word "virus" which is in the second order is determined to be a word to be displayed with emphasis in the subsequent explanatory note.

The link file identification process of the step S90 of FIG. 7 will now be described in greater detail with reference to FIG. 9. After an inputted voice signal (digital form) is temporarily stored in the system memory 2, a feature of a phoneme is extracted (steps S310 to S320). The extracted feature is applied to each word model to calculate the likelihood and specify the word of the highest score as a recognized word. In the preferred embodiment of this invention, if the score does not reach a threshold, the user is prompted to input again. For example, when the user inputs "hotel (ho'ute'1)" in a voice, a word model for each of the words "ho'ut'e1", "se'ilz", "t e'in", "k mpju:t", and "va'ir s" is prepared, the likelihood is calculated and, as a result, a word model corresponding to "ho'ute'1" is selected. In this manner, the CPU 1 compares the phonetic reading of multiple words in the word extract region (refer to FIG. 6) with the prepared character string to detect a matching character string. In this case, "ho'ute'1" matches. Accordingly, "news1.html" of FIG. 6 is obtained as the corresponding link file name (steps S330 to S340).

As described above, the browser in the client side displays with emphasis a representative word in each explanatory note of the link file in the HTML document taken in. When the user voice inputs a desired word, the browser links to a link file related to the inputted word to read out that link file for display. The user need not indicate the explanatory note by a mouse or input the entire explanatory note by a voice as in the prior art.

The following modes may be practiced beside the above mode of practice:

1) While the phonetic reading of a word extracted from the HTML document is compared with the character string showing the voiced content obtained from the result of voice recognition in the above mode of practice, in the Japanese language, it is possible to change the result of voice recognition to a word of Kanji mixed with Kana and compare it with a word of Kanji mixed with Kana extracted from the above HTML document. However, for example, because the language contains many words of same pronunciation with different meanings, a higher precision is obtained by a comparison between the phonetic reading and the voiced content as the above mode of practice.

Figure 5A:
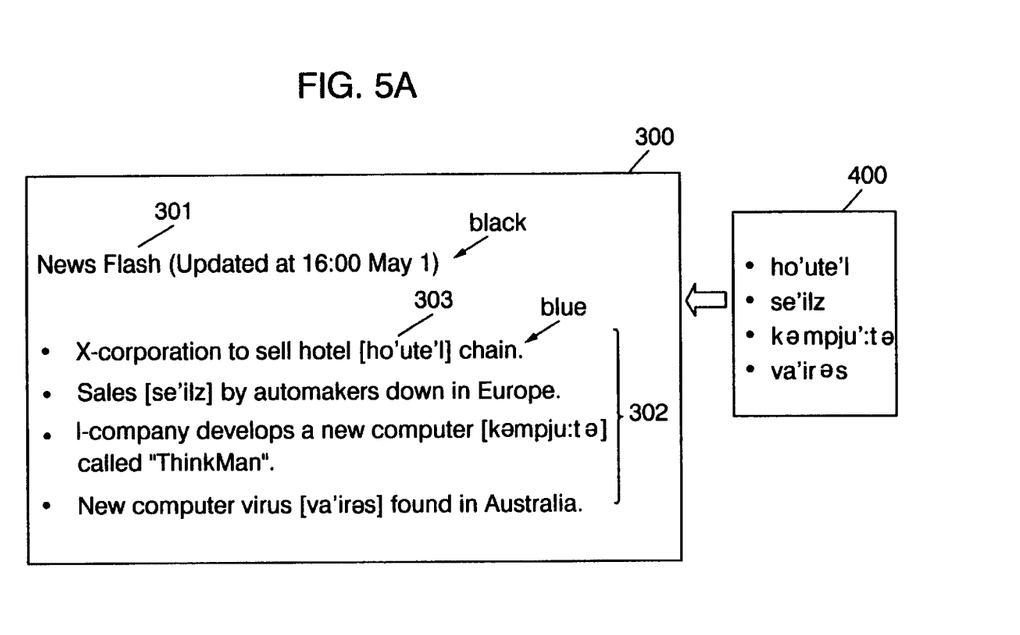
FIGS. 5A and 5B shows a display content of one embodiment of the present invention of an HTML document.
Figure 5B:
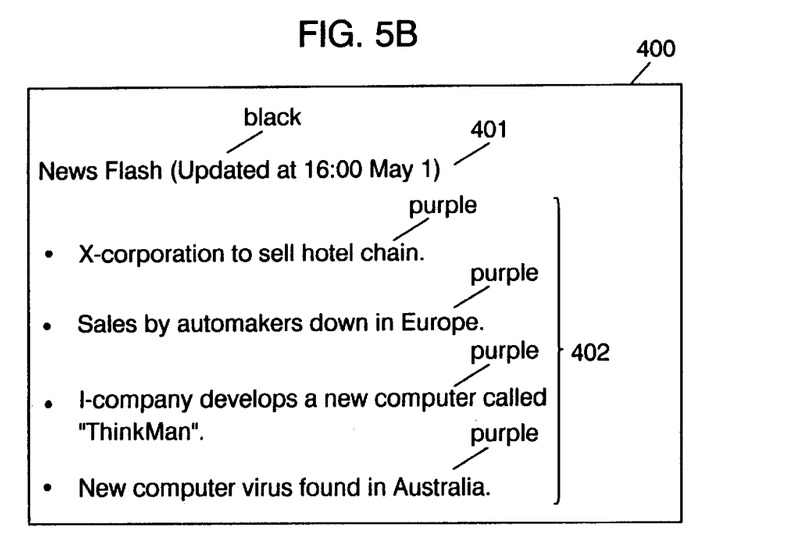

2) In the above mode of practice, a word which can be voice inputted is added with a notation of phonetic reading for emphasized display (refer to FIG. 5A). Because the notation of phonetic reading is displayed, this display is different from the display form of the original HTML document. When it is desired to make the display form identical to the original text, the word to be voice inputted may be displayed with emphasis in a color (purple) different from the color (black) of the display only character string and the color (blue) of the explanatory note 402 of the link file as shown in the display 400 of FIG. 5B). To display with emphasis, the font may be differentiated by changing to a bold font or the character size may be changed.

3) While it was described in the above mode of practice that the file to be linked is stored in the same server, the file may be stored in other server. The file to be linked may be a file which is stored in the client itself.

4) The following criteria may be used as a criteria to select a word in the explanatory note of a link file for emphasized display.

(a) A numeric value indicating the degree of usage is written in each word of the word dictionary 22 in advance. A frequency appearing in a news paper, etc., may be used as the usage frequency. The usage frequency is used for ordering. Also, when the voice recognition program is used simply for inputting a character or a word, the usage of word conversions may be counted and the resulting count may be used as usage information.

(b) Because a subject mostly appears first in the Japanese language, the word position in the explanatory note is used for ordering.

While one word was selected for emphasized display for each explanatory note of a link file in the above mode of practice, a plurality of words may be selected without being limited to this. In this case, a method of selecting multiple words of higher order and a method of selecting a word of the highest order for each note (a character string ending with a symbol "." or ",") of an explanatory note comprising multiple notes is available.

6) While the above mode of practice showed an example of implementing a browser by a general purpose computer, this invention can be equally implemented with other information processing equipment.

As described above, the user can indicate a file to be linked by voice inputting of a word because the word is displayed for guidance in the explanatory note of the file to be linked. Further, the user in the server side preparing a document (HTML document) can decide a written content regardless of the indication by a pointing device or a voice input because there is no restriction of writing for a voice input. It is also possible to select a link file by voice with respect to an existing document. Even if there are multiple words in the explanatory note of a link file, the word to be displayed with emphasis can be automatically decided by comparing the number of characters of a word. Because a phonetic reading is added to the emphasized word, the user will not mix up the voiced content even if a Kanji is contained in the word. A word to be voice inputted can be guided while precisely reflecting the arrangement of character string of a document provided by a server side by emphasizing the word to be voice inputted with a different color. Generally, it is not always easy even for a native speaker to pronounce a Kanji.

Although the present invention has been described with respect to a specific preferred embodiment thereof, various changes and modifications may be suggested to one skilled in the art, and it is intended that the present invention encompass such change and modifications as fall within the scope of the appended claims.

What we claimed is:

1. An information processing apparatus which takes in a document containing a file name of at least one file to be linked and at least one explanatory note associated with the file name of the at least one file to be linked, the apparatus displays at least a part of the at least one explanatory note and acquires the at least one file to be linked when the at least one explanatory note is selected, comprising:

first means for specifying a key word which is to be displayed with emphasis in the at least one explanatory note;

second means for applying an emphasized display conversion to said key word;

third means for acquiring inputted voice information;

fourth means for selecting a word corresponding to said inputted voice information fifth means for acquiring a linked file name associated with the at least one explanatory note containing said corresponding word; and sixth means for visually displaying pronunciation information for said key word for visually assisting a user to correctly pronounce said key word.

2. The information processing apparatus of claim 1, wherein said first means identifies a word having a largest number of characters as said key word to be displayed with emphasis.

3. The information processing apparatus of the claim 2, wherein said key word detected by said first means is displayed with emphasis in a color different from any other display.

4. The information processing apparatus of claim 1, wherein the first means for specifying a key word further comprises seventh means for associating the key word with the linked file name.

5. The system according to claim 1, further comprising:

means for specifying a key word in each of a plurality of explanatory notes;

means for generating pronunciation information for each said key word specified for each of said plurality of explanatory notes;

means for displaying a guide within which each said pronunciation information is displayed for visually assisting a user to correctly pronounce each said key word;

means for acquiring an inputting voice pronunciation; and means for selecting a word which most closely corresponds to said inputted pronunciation.

6. A method of taking in a document including file names of at least one file to be linked and at least one explanatory note associated with each of the file names of the at least one file to be linked, displaying at lest a part of the at least one explanatory note, and acquiring a file of a filename associated with a selected at least one explanatory note, comprising the steps of:

specifying a key word which is to be displayed with emphasis in each of the at least one explanatory note;

visually displaying pronunciation information for said key word for each of the at least one explanatory note for visually assisting a user to correctly pronounce said key word;

applying an emphasized display conversion to said specified key word;

acquiring inputting voice information;

selecting a word corresponding to said inputted voice information, and acquiring a linked file name associated with an explanatory note containing said selected word.

7. The method according to claim 5, further comprising the steps of:

specifying a key word in each of a plurality of explanatory notes;

generating pronunciation information for each said key word specified for each of said plurality of explanatory notes;

displaying a guide within which each said pronunciation information is displayed, said guide for displaying a list of each said pronunciation information for visually assisting a user to correctly pronounce each said key word;

acquiring an inputting voice pronunciation; and selecting a word which most closely corresponds to said inputted pronunciation.

8. A recording medium storing a program operating on a data processing system for taking in a document containing a file name of at least one file to be linked and at least one explanatory note associated with the file name of the at least one file to be linked, displaying at least a part of the at least one explanatory note in a display and acquiring a file of the file name associated with a selected at least one explanatory note, said program comprising:

program code means for specifying a key word to be displayed with emphasis in each of the at least one explanatory note;

program code means for visually displaying pronunciation information for said key word for each of the at least one explanatory note for visually assisting a user to correctly pronounce said key word;

program code means for applying an emphasized display conversion to said specified key word;

program code means for acquiring inputted voice information and selecting a word corresponding to said inputted voice information; and program code means for acquiring a linked file associated with an explanatory note containing said selected word.

9. The recording medium according to claim 6, further comprising:

program code means for specifying a key word in each of a plurality of explanatory notes;

program code means for generating pronunciation information for each said key word specified for each of said plurality of explanatory notes;

program code means for displaying a guide within which each said pronunciation information is displayed for visually assisting a user to correctly pronounce each said key word;

program code means for acquiring an inputting voice pronunciation; and program code means for selecting a word which most closely corresponds to said inputted pronunciation.

10. A method in a data processing system, comprising:

receiving a document including a file name of at least one file to be linked and at least one explanatory note associated with the file name;

specifying a key word in the at least one explanatory note such that the key word uniquely identifies the explanatory note;

associating the key word with the linked file name;

visually displaying pronunciation information for said key word for each of the at least one explanatory note for visually assisting a user to correctly pronounce said key word;

receiving inputted voice information;

identifying a key word corresponding to the inputted voice information; and reading a file corresponding to the linked file name associated with the key word.

11. The method of claim 10, further comprising storing the linked file name in association with the key word.

12. The method of claim 11, further comprising storing a pronunciation of the key word in association with the key word.

13. An information processing apparatus, comprising:

first means for receiving a document including a file name of at least one file to be linked and at least one explanatory note associated with the file name;

second means for specifying a key word in the at least one explanatory note such that the key word uniquely identifies the explanatory note;

third means for associating the key word with the linked file name;

fourth means for receiving inputted voice information;

fifth means for identifying a key word corresponding to the inputted voice information;

sixth means for reading a file corresponding to the linked file name associated with the key word; and seventh means for visually displaying pronunciation information for said key word for each of the at least one explanatory note for visually assisting a user to correctly pronounce said key word.

14. The apparatus of claim 13, further comprising seventh means for storing the linked file name in association with the key word.

15. The apparatus of claim 14, further comprising eighth means for storing a pronunciation of the key word in association with the key word.

16. An information processing apparatus which takes in a document containing a file name of at least one file to be linked and at least one explanatory note associated with the file name of the at least one file to be linked, the apparatus displays at least a part of the at least one explanatory note and acquires the at least one file to be linked when the at least one explanatory note is selected, comprising:

first means for specifying a key word indictor which is to be displayed in association with the at least one explanatory note;

second means for associating the key word indicator with the linked file name associated with the at least one explanatory note;

third means for acquiring inputted voice information;

fourth means for selecting an indicator corresponding to said inputted voice information;

fifth means for acquiring a linked file name associated with the selected indicator; and sixth means for visually displaying pronunciation information for said key word for each of the at least one explanatory note for visually assisting a user to correctly pronounce said key word.

17. A method of taking in a document including file names of at least one file to be linked and at least one explanatory note associated with each of the file names of the at least one file to be linked, displaying at least a part of the at least one explanatory note, and acquiring a file of a file name associated with a selected at least one explanatory note, comprising the steps of:

specifying a key word indictor which is to be displayed in association with the at least one explanatory note;

associating the key word indicator with the linked file name associated with the at least one explanatory note;

acquiring inputted voice information;

selecting an indicator corresponding to said inputted voice information;

acquiring a linked file name associated with the selected indicator; and visually displaying pronunciation information for said key word for each of the at least one explanatory note for visually assisting a user to correctly pronounce said key word.

* * * * *